US012010472B2

(12) United States Patent
Liang et al.

(10) Patent No.: US 12,010,472 B2
(45) Date of Patent: Jun. 11, 2024

(54) ACOUSTIC MESH FOR ELECTRONIC DEVICES

(71) Applicant: Apple Inc., Cupertino, CA (US)

(72) Inventors: Jiahui Liang, San Francisco, CA (US); Andrew L. Doyle, San Francisco, CA (US); Christopher S. Hyde, Palo Alto, CA (US); David M. Pelletier, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 124 days.

(21) Appl. No.: 17/661,492

(22) Filed: Apr. 29, 2022

(65) Prior Publication Data

US 2023/0083314 A1 Mar. 16, 2023

Related U.S. Application Data

(60) Provisional application No. 63/261,147, filed on Sep. 13, 2021.

(51) Int. Cl.

| | |
|---|---|
| ***H04R 1/02*** | (2006.01) |
| ***G04G 17/04*** | (2006.01) |
| ***G04G 17/08*** | (2006.01) |

(52) U.S. Cl.

CPC ............. *H04R 1/023* (2013.01); *G04G 17/04* (2013.01); *G04G 17/08* (2013.01); *H04R 1/028* (2013.01)

(58) Field of Classification Search

CPC . H04R 1/00; H04R 1/02; H04R 1/023; H04R 1/028; H04R 1/086; H04R 1/2846; G04G 17/04; G04G 17/08

See application file for complete search history.

(56) References Cited

U.S. PATENT DOCUMENTS

| | | | | |
|---|---|---|---|---|
| 10,862,190 | B1 * | 12/2020 | Ramasamy | G06F 1/1688 |
| 2005/0179813 | A1 * | 8/2005 | Fujii | H04N 23/51 348/E5.026 |
| 2009/0245565 | A1 * | 10/2009 | Mittleman | H04R 1/025 381/189 |
| 2014/0064542 | A1 * | 3/2014 | Bright | H04R 1/086 381/359 |
| 2016/0316285 | A1 * | 10/2016 | Qian | H04R 1/086 |
| 2018/0084324 | A1 * | 3/2018 | Vitt | H04R 9/025 |
| 2020/0186939 | A1 * | 6/2020 | Zou | B81B 7/0058 |
| 2021/0078856 | A1 * | 3/2021 | Zou | B81B 3/0018 |
| 2021/0243925 | A1 * | 8/2021 | Ramasamy | H05K 9/0015 |

* cited by examiner

*Primary Examiner* — Thang V Tran

(74) *Attorney, Agent, or Firm* — Dorsey & Whitney LLP

(57) ABSTRACT

An electronic device can include a housing that defines an internal volume, an aperture defined by the housing, an electronic component disposed within the internal volume and occluding the aperture, and a mesh component disposed against the electronic component. One example of an electronic device can include a housing that defines an internal volume, a port defined by the housing, a speaker module disposed within the internal volume and oriented to move air through the port, and an acoustically transparent mesh covering the port. The mesh can include a raised portion extending at least partially through the port and a flange extending from the raised portion, the flange secured against an internal surface of the housing.

19 Claims, 12 Drawing Sheets

ACOUSTIC MESH FOR ELECTRONIC DEVICES

CROSS-REFERENCE TO RELATED APPLICATION(S)

This application claims the benefit of U.S. Provisional Patent Application No. 63/261,147, filed 13 Sep. 2021, entitled "ACOUSTIC MESH FOR ELECTRONIC DEVICES," the disclosure of which is incorporated herein by reference in its entirety.

FIELD

The described embodiments relate generally to electronic devices and component thereof. More particularly, the present embodiments relate to mesh components and assemblies of electronic devices.

BACKGROUND

Many electronic devices include internal components that communicate, interface, or interact with the environment external to the device in some way. Often, these internal components can do so through one or more apertures or ports formed in a housing of the electronic device. In order to protect the internal components from debris such as dust and water entering these apertures or ports, one or more mesh components and assemblies can be provided that occlude the apertures or ports to protect the internal components but still allow the internal components to interact with the external environment as need through the mesh component.

However, mesh components of the prior art are often not designed adequately to withstand external forces to protect the mesh or internal components from damage. In addition, current mesh designs make it difficult to eject water or other debris from the internal volume of the electronic device, which may enter from the external environment through the mesh. Also, current mesh designs tend to lack aesthetically and tactilely pleasing design features.

SUMMARY

In a particular example of the present disclosure, an electronic device includes a housing that defines an internal volume, an aperture defined by the housing, an electronic component disposed within the internal volume and occluding the aperture, and a mesh component disposed against the electronic component.

In one example, the electronic device can further include an adhesive disposed between the electronic component and the mesh component. In one example, the electronic component includes a speaker module. In one example, the electronic device further includes an elastic barrier disposed between the mesh component and an inside surface of the housing. In one example, the elastic barrier is disposed against an internal surface of the housing around a perimeter of the aperture. In one example, the elastic barrier includes a foam material. In one example, the foam material is elastically compressed between the mesh component and the housing. In one example, the electronic device also includes an adhesive disposed between the elastic barrier and the mesh component.

In another particular example, an electronic device includes a housing that defines an internal volume, a port defined by the housing, a speaker module disposed within the internal volume and oriented to move air through the port, and an acoustically transparent mesh covering the port. The mesh can include a raised portion extending at least partially through the port and a flange extending from or along the raised portion, the flange secured against an internal surface of the housing.

In one example, the electronic device can further include a support bracket disposed against the flange such that the flange is disposed between the support bracket and the internal surface. In one example, the support bracket includes a support flange disposed against the flange of the mesh and a compliant mechanism that urges the mesh against the internal surface. In one example, the compliant mechanism includes an elastic protrusion pressing against the speaker module. In one example, the elastic protrusion extends outward and away from the support flange. In one example, the electronic device further includes an adhesive layer disposed between the flange and the internal surface of the housing. The adhesive layer can secure the flange to the internal surface of the housing. In one example, the raised portion defines an external surface disposed flush with an external surface of the housing.

In another example of the present disclosure, an electronic device can include a housing defining an aperture, a mesh component occluding the aperture, and an elastic member disposed against the mesh component and biased toward an internal surface of the housing.

In one example, the mesh component is disposed between the elastic member and the housing. In one example, the elastic member is disposed between the mesh component and the housing. In one example, the electronic device can further include an internal electronic component. In such an example, the mesh component can be disposed between the internal electronic component and the elastic member. In one example, the mesh component can be disposed directly against the internal electronic component and the elastic member can be elastically compressed between the housing and the mesh component.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
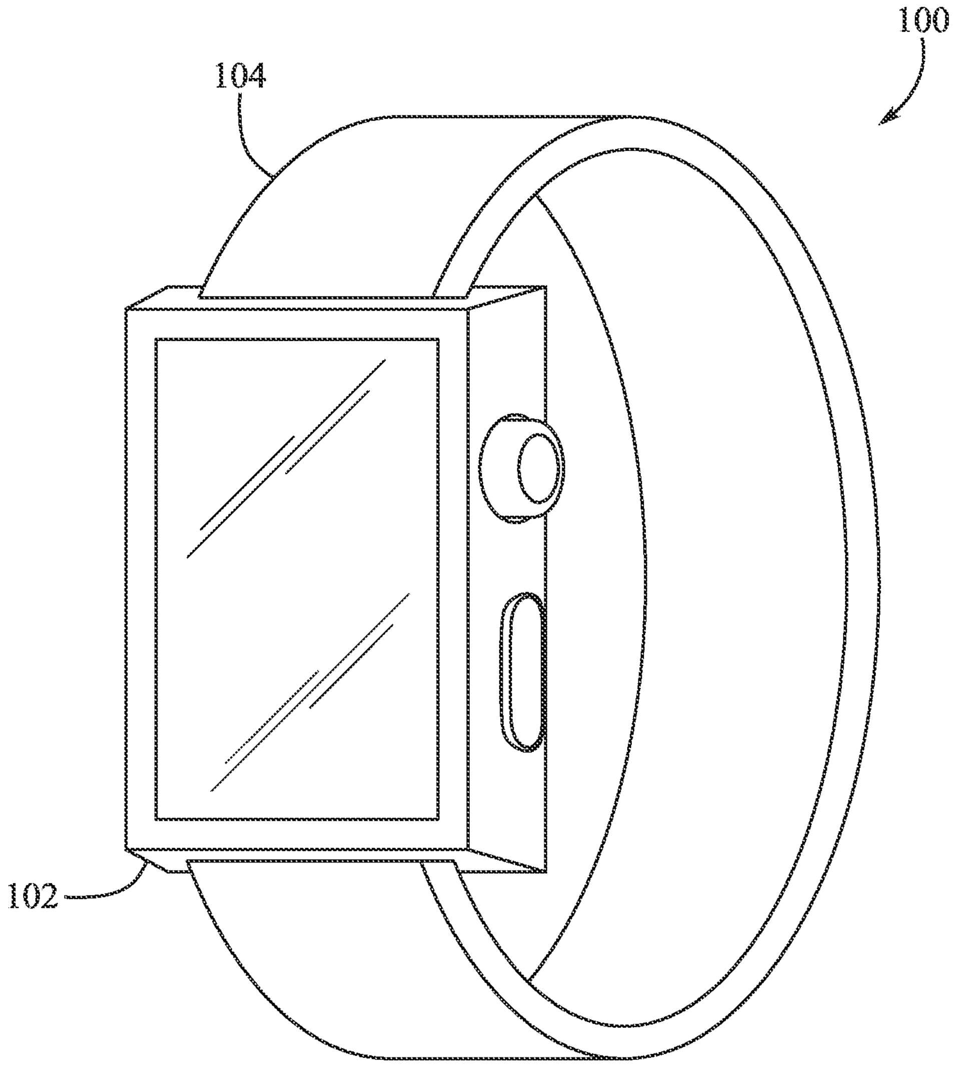
FIG. 1A shows a perspective view of an example of an electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to mesh components and assemblies for electronic devices. In a particular example, an electronic device includes a housing that defines an internal volume, an aperture defined by the housing, an electronic component disposed within the internal volume and occluding the aperture, and a mesh component disposed against the electronic component.

In another particular example, an electronic device includes a housing that defines an internal volume, a port defined by the housing, a speaker module disposed within the internal volume and oriented to move air through the port, and an acoustically transparent mesh covering the port. The mesh can include a raised portion extending at least partially through the port and a flange extending from or along the raised portion, the flange secured against an internal surface of the housing.

Mesh components and assemblies described herein provide improved water and debris ejection features over meshes of the prior art. Mesh components described herein are also strong, durable, and resistant to damage. In addition, the mesh components and assemblies described herein can be uniquely designed, colored, and arranged to form an aesthetically pleasing mesh over a speaker or other internal component of an electronic device.

For example, mesh components described herein can include one or more stiff metal materials, including stainless steel and/or titanium, which minimize or substantially eliminate deflections in the mesh caused by water or debris moving through one or more perforation holes of the mesh. Also, for example, when disposed over an internal speaker of an electronic device, the meshes described herein can be constructed of stiff metal to reduce or substantially eliminate vibrations or deflections that may be caused by air and sound waves produced by the speaker and travelling through the mesh component. Thus, the stiff construction of the mesh components described herein improve sound quality and water ejection when subject to high pressures under water or other debris entering through the mesh form an external environment.

In addition, one or more biasing members or supporting brackets can be disposed against the mesh component described herein to support the mesh components and maintain the proper position of the mesh component within or across a port of the electronic device. For example, a support bracket including a compliant mechanism can create a counterforce that acts against the mesh components described herein to bias the mesh component toward and against an internal surface of a housing of the electronic device. The counterforce of the compliant mechanism of the support bracket can resist forces that may act on the mesh component during use, which would otherwise cause the mesh component to fall into or towards the internal volume of the device or otherwise fall out of place.

In addition, mesh components of the present disclosure can be formed with raised features or external surfaces that are disposed flush with an external surface of a housing of an electronic device. This flush surface is aesthetically and tactilely pleasing. In addition, the metal materials of the mesh components described herein can be anodized or have added layers formed by physical vapor deposition methods in order to customize and tune the color of the mesh to be aesthetically pleasing.

In addition to the advantages described above, the mesh components of the present disclosure ensure that internal components can sufficiently interact with an environment external to the electronic device as needed without the risk of damage to the internal component. Such internal components that interact with the external environment can include, but are not limited to, speakers, microphones, pressure sensors and other sensors, and the like. These and other internal components can be disposed adjacent to or aligned below one or more apertures/ports of the electronic device, with a mesh component occluding the apertures/ports and disposed between the aperture/port and the internal electronic component. In this way, the mesh components described herein can act as a barrier between the internal component and the external environment while also enabling the proper functioning of the internal component.

These and other embodiments are discussed below with reference to FIGS. 1-10B. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

In the present disclosure, a wearable electronic watch is used as an example of an electronic device that incorporates the meshes, mesh components, and mesh configurations described herein. This smart watch is used for illustrative purposes only to show an example implementation of the meshes and mesh configurations of the present disclosure but the meshes, mesh components, and mesh configurations can implemented in any number of electronic devices other than a wearable electronic watch, which includes an internal component interacting with the environment external to the device, for example speakers and sensors. Examples of meshes, mesh components, and mesh configurations disclosed herein can be included in any number of electronic devices, including but not limited to desktop computers, laptop computers, tablets, smartphones, smart speakers, wearable electronic devices such as fitness trackers, smart watches, head-mountable-display devices or other alternate/virtual reality devices, and so forth.

Along these lines, FIG. 1A shows an example of an electronic device 100. The electronic device shown in FIG. 1A is a watch, such as a smartwatch. The smartwatch of FIG. 1A is merely one representative example of a device that can be used in conjunction with the systems and methods disclosed herein. Electronic device 100 can correspond to any form of wearable electronic device, a portable media player, a media storage device, a portable digital assistant ("PDA"), a tablet computer, a computer, a mobile communication device, a GPS unit, a remote control device, or other electronic device. The electronic device 100 can be referred to as an electronic device, or a consumer device. In some examples, the electronic device 100 can include a housing 102 that can carry operational components, for example, in an internal volume at least partially defined by the housing. The electronic device 100 can also include a strap 103, or other retaining component that can secured the device 100 to a body of a user as desired. Further details of the electronic device are provided below with reference to FIG. 1B.

Figure 1B:
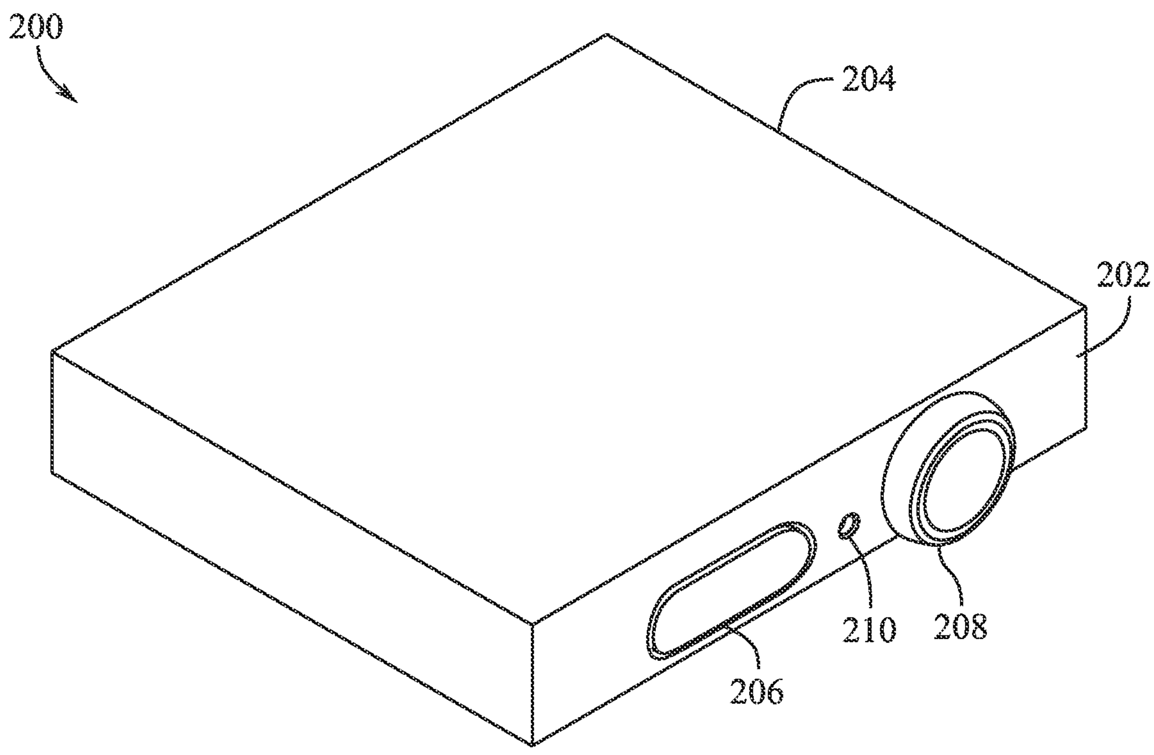
FIG. 1B shows a top perspective view of a portion thereof.

FIG. 1B illustrates a smartwatch 200 that can be substantially similar to, and can include some or all of the features of the devices described herein, such as electronic device 100. The device 200 can include a housing 202, and a display assembly 204 attached to the housing. The housing 202 can substantially define at least a portion of an external surface of the device 200.

The display assembly 204 can include a glass, a plastic, or any other substantially transparent external layer, material, component, or assembly. The display assembly 204 can include multiple layers, with each layer providing a unique function, as described herein. Accordingly, the display assembly 204 can be, or can be a part of, an interface component. The display assembly 204 can define a front external surface of the device 200 and, as described herein, this external surface can be considered an interface surface. In some examples, the interface surface defined by display assembly 204 can receive inputs, such as touch inputs, from a user.

In some examples, the housing 202 can be a substantially continuous or unitary component and can define one or more openings to receive components of the electronic device 200. In some examples, the device 200 can include input components such as one or more buttons 206 and/or a crown 208 that can be disposed in the openings. In some examples, a material can be disposed between the buttons 206 and/or crown 208 and the housing 202 to provide an airtight and/or watertight seal at the locations of the openings. The housing 202 can also define one or more openings or apertures, such as aperture 210 that can allow for sound to pass into or out of the internal volume defined by the housing 202. For example, the aperture 210 can be in communication with a microphone component disposed in the internal volume. In some examples, the housing 202 can define or include a feature, such as an indentation to removably couple the housing 202 and a strap or retaining component.

Figure 1C:
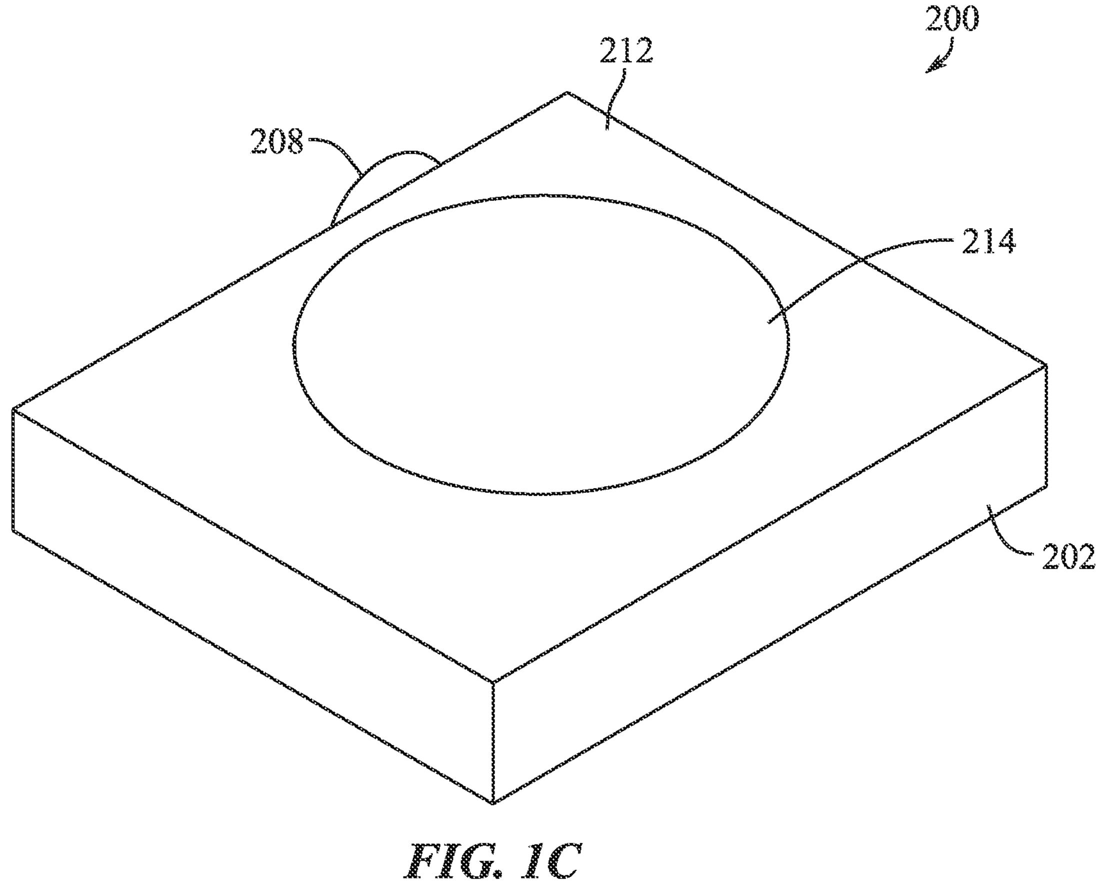
FIG. 1C shows a bottom perspective view of a portion thereof.

FIG. 1C shows a bottom perspective view of the electronic device 200. The device 200 can include a back cover 212 that can be attached to the housing 202, for example, opposite the display assembly 204. The back cover 212 can include ceramic, plastic, metal, or combinations thereof. In some examples, the back cover 212 can include an at least partially electromagnetically transparent component 214. The electromagnetically transparent component 214 can be transparent to any desired wavelengths of electromagnetic radiation, such as visible light, infrared light, radio waves, or combinations thereof. In some examples, the electromagnetically transparent component 214 can allow sensors and/or emitters disposed in the housing 202 to communicate with the external environment. Together, the housing 202, display assembly 204 and back cover 212 can substantially define an internal volume and an external surface of the device 200.

Figure 1D:
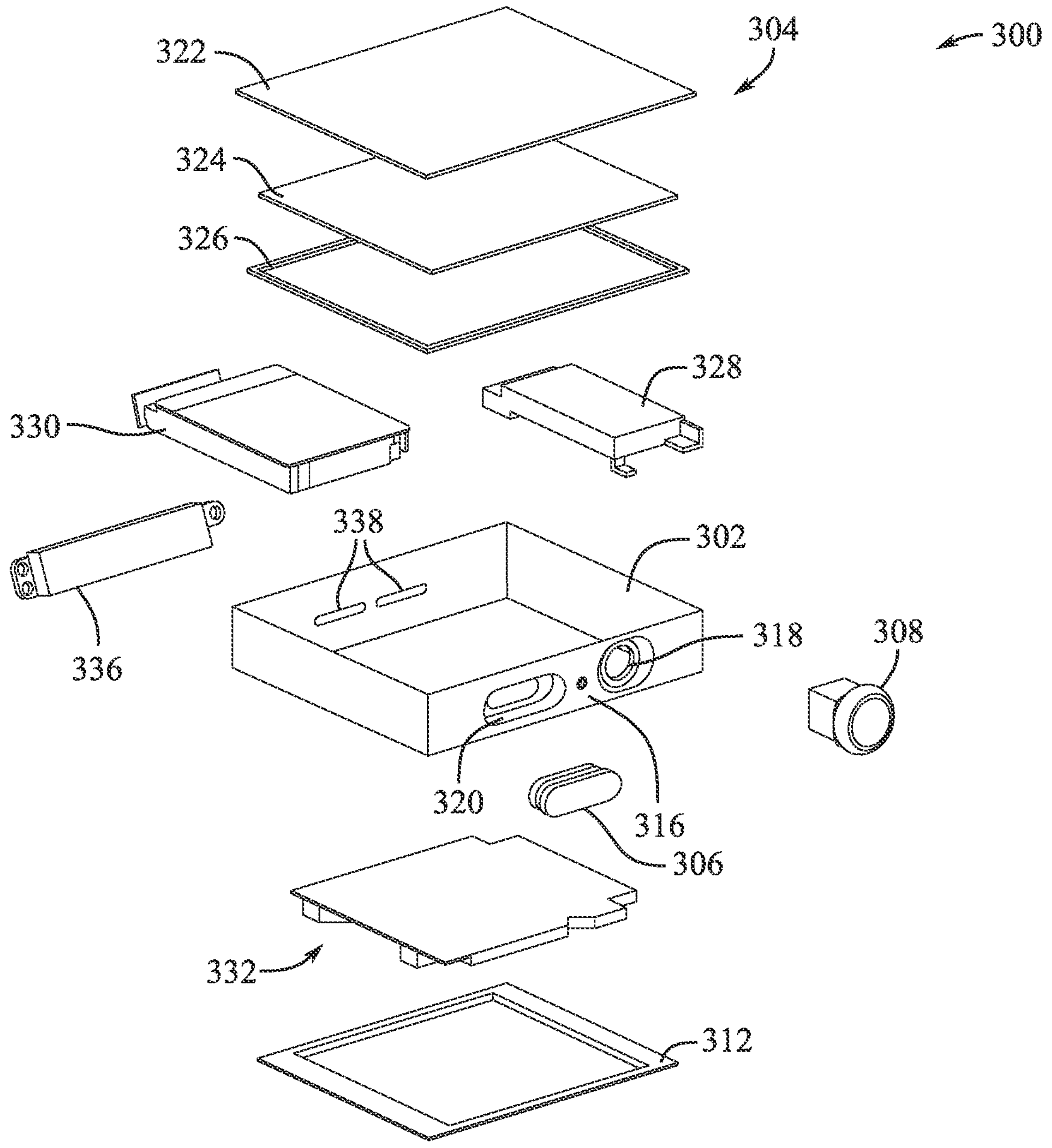
FIG. 1D shows an exploded view thereof.

FIG. 1D illustrates an exploded view of a smartwatch 300 that can be substantially similar to, and can include some or all of the features of the devices described herein, such as electronic devices 100 and 200. The device 300 can include a housing 302, a display assembly 304, and a back cover 312. Together, the housing 302, display assembly 304, and back cover 312 can define an external surface and an internal volume of the device 300.

The housing 302 can be a substantially continuous or unitary component, and can define one or more apertures 316, 338 to receive components of the electronic device 300 and/or to provide access to an internal portion of the electronic device 300. In some examples, the device 300 can include input components such as one or more buttons 306 and/or a crown 308 that can be disposed in the apertures 318, 320. In addition, at least one example of the housing 302 defines one or more apertures 318, 320, 338 that provide an internal component access to the environment external to the device 300 and housing 302.

The display assembly 304 can be received by and can be attached to the housing 302. The display assembly can include a cover including a transparent material, such as plastic, glass, and/or ceramic. The display assembly 304 can also include a display stack or display assembly that can include multiple layers and components, each of which can perform one or more desired functions. For example, the display stack can include a display layer 324 that can include a touch detection layer or component, a force sensitive layer or component, and one or more display layers or components that can include one or more pixels and/or light emitting portions to display visual content and/or information to a user. In some examples, the display layer or component 324 can include a liquid crystal display (LCD), a light emitting diode (LED) display, an organic light emitting diode (OLED) display, and/or any other form of display. The display layer 324 can also include one or more electrical connectors to provide signals and/or power to the display layer 324 from other components of the device 300.

In some examples, the device 300 can include a gasket or seal 326 that can be disposed between the display assembly 304 and the housing 302 to substantially define a barrier to the ingress of liquids or moisture into the internal volume from the external environment at the location of the seal 326. As described herein, the seal 326 can include polymer, metal, and/or ceramic materials. The device 300 can also include a seal 334 that can be disposed between the housing 302 and the back cover 312 to substantially define a barrier to the ingress of liquids or moisture into the internal volume from the external environment at the location of the seal 334. As described herein, the seal 334 can include polymer, metal, and/or ceramic materials. The seal 334 can be substantially similar to and can include some or all of the features of the seal 326.

The device 300 can also include internal components, such as a haptic engine 328, a battery 330, an audio module 336, and a logic board 332, also referred to as a main logic board 332 that can include a system in package (SiP) disposed thereon, including one or more integrated circuits, such as processors, sensors, and memory. The SiP can also include a package.

In some examples, the device 300 can include one or more wireless antennas that can be in electrical communication with one or more other components of the device 300. In some examples, one or more antennas can receive and/or transmit wireless signals at one or more frequencies and can be, for example, one or more of a cellular antenna such as an LTE antenna, a Wi-Fi antenna, a Bluetooth antenna, a GPS antenna, a multi-frequency antenna, and the like. The antenna or antennas can be communicatively coupled to one or more additional components of the electronic device 300. In some examples, one or more other components of the device 300 can include a portion or part of an antenna, such as a radiating element thereof.

The internal components can be disposed within the internal volume defined at least partially by the housing 302, and can be affixed to the housing 302 via adhesives, internal surfaces, attachment features, threaded connectors, studs, posts, or other features, that are formed into, defined by, or otherwise part of the housing 302 and/or the cover 322 and/or back cover 312.

In addition to those components and features of device 300, both internal and external to the housing 302, shown in FIG. 1D, an example of a device can also include one or more electronic components disposed within the internal volume of the device 300 that communicates with an external environment (i.e., an environment outside/external to the housing 302) through the one or more apertures 318, 320, 338 defined by the housing 302. In one example, such an internal electronic component can include one or more sensors that send and receive light or other electromagnetic signals through the one or more apertures 318, 320, 338. In one example, such an internal electronic component can include one or more speakers or speaker modules positioned and oriented to move air through the one or more apertures 318, 320, 338 defined by the housing 302. In at least one example, an aperture defined by the housing 302 that allows access for one or more internal electronic components to interact, communication, or otherwise interface with the external environment can be referred to as a port. That is, apertures 318, 320, 338 defined by housing 302 can be referred to herein as a port.

Figure 2A:
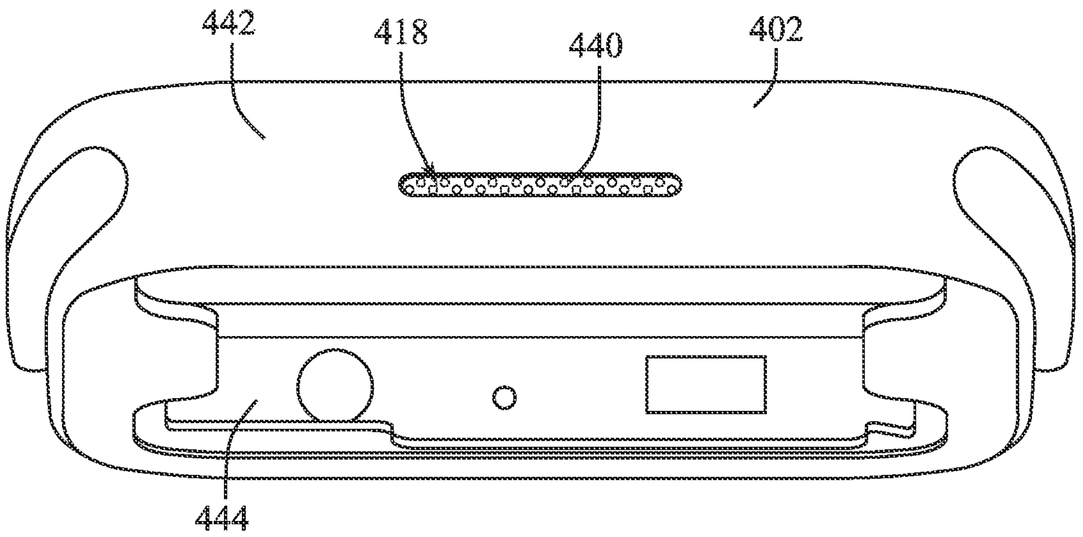
FIG. 2A shows a perspective view of a housing of an electronic device.

FIG. 2A illustrates an example of a housing 402 of an electronic device, with the housing defining a port 318. In order to prevent dirt, dust, water, or other debris from the external environment from entering into the internal volume defined by the housing 402, a mesh component 440 can be disposed over or across the port 418. The term "mesh," as used herein, can include a barrier or material portion that allows air to pass through but prevents or substantially prevents other debris, such as water, dirt, and dust, from passing through to the internal volume of the device. In one example, the mesh component 440 can include a perforated material. The size, locations, and number of perforations extending through such a mesh can vary from one example to another. Such perforations can include machined, laser cut, or otherwise manufactured openings defined by and extending through the material. Such openings can be sized and arranged to prevent a certain size particle from the external environment from passing through the mesh component 440. Such openings can also be sized to prevent water from passing through the mesh component 440 at certain pressures.

Some examples of materials that can be perforated to form the mesh component 440 and other mesh components described herein include rubbers, plastics, and other polymers. Other examples of meshes 440 can include metals such as steel, stainless steel, aluminum, and so forth. Ceramics can also be used to form the mesh component 440 and other meshes described herein. In at least one example, the mesh component 440 can be a porous material allowing air to pass through but preventing or substantially preventing dust and other debris particles from the external environment from passing through the mesh component 440 to an internal volume of the device. Some examples of such materials can include foams, knitted fabrics, other textiles, or other porous materials. In one example, the mesh component 440 can be formed as a square woven mesh or a wire mesh. Other materials can include fibers such as synthetic monofilament fibers and the like. The density of polymer meshes and other types of meshes, including porous and perforated meshes, can be tuned to be able to resist the ingress of water at high pressures. Typically, the higher the density, the higher the resistance.

Figure 2B:
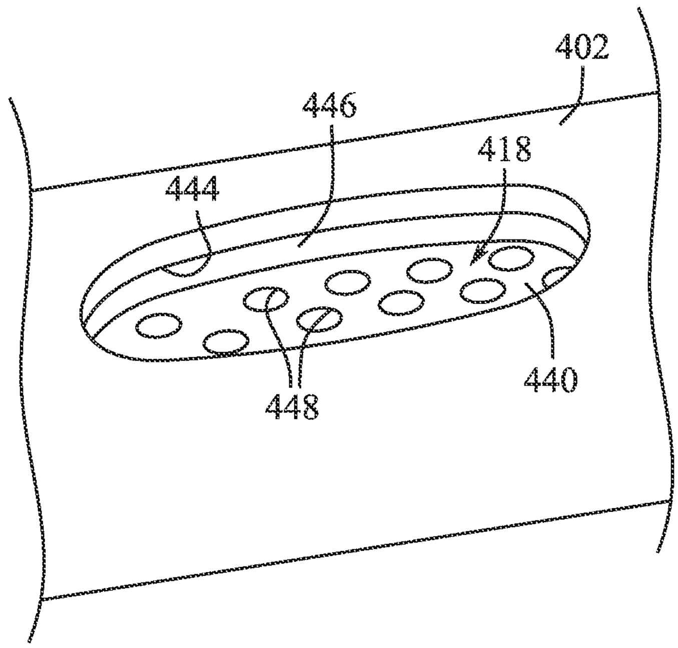
FIG. 2B shows a cross-sectional view thereof.
Figure 2C:
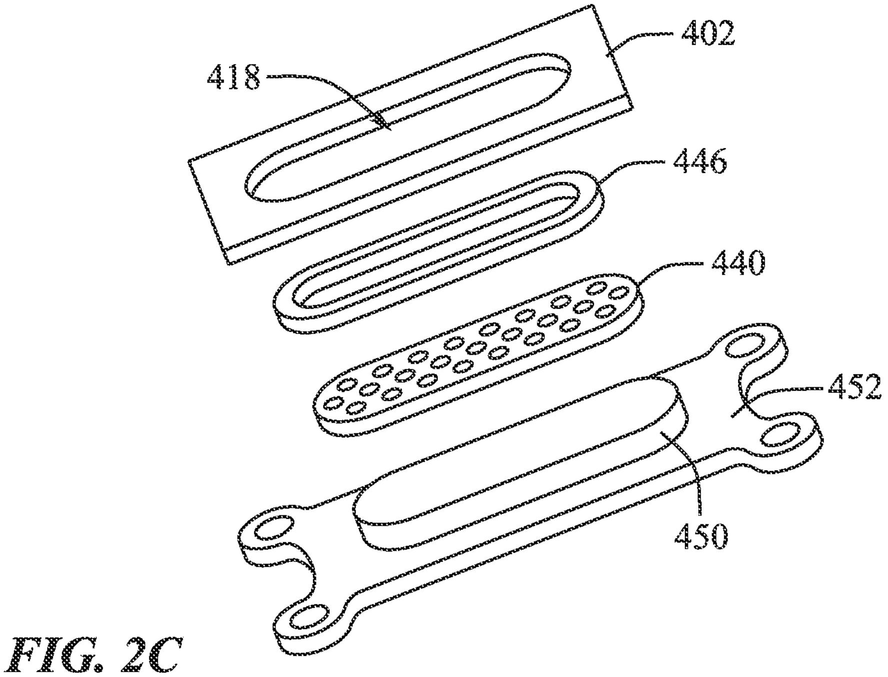
FIG. 2C shows a partial exploded view thereof.
Figure 2D:
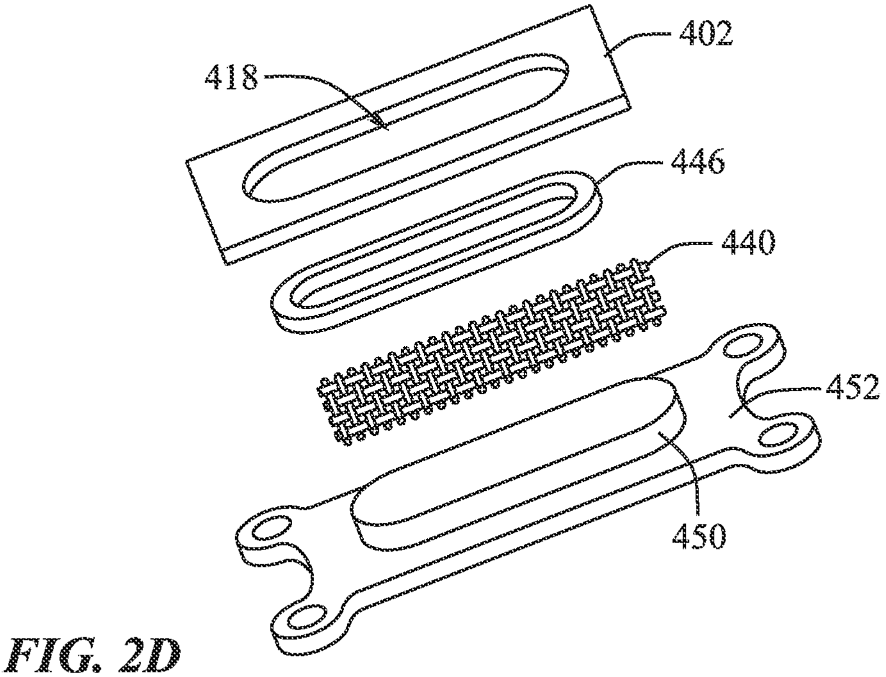
FIG. 2D shows another partial exploded view thereof.
Figure 2E:
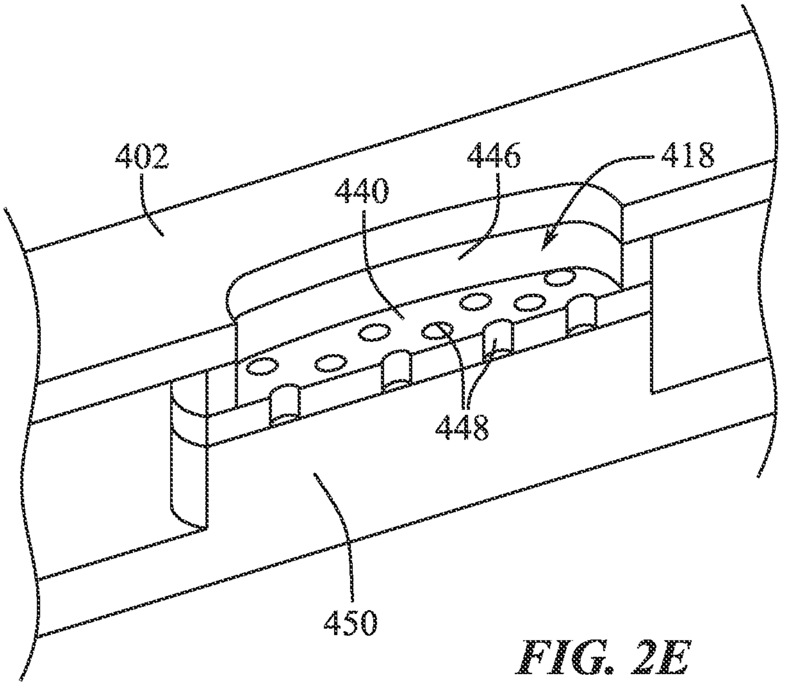
FIG. 2E shows a partial cross-sectional view thereof.
Figure 3:
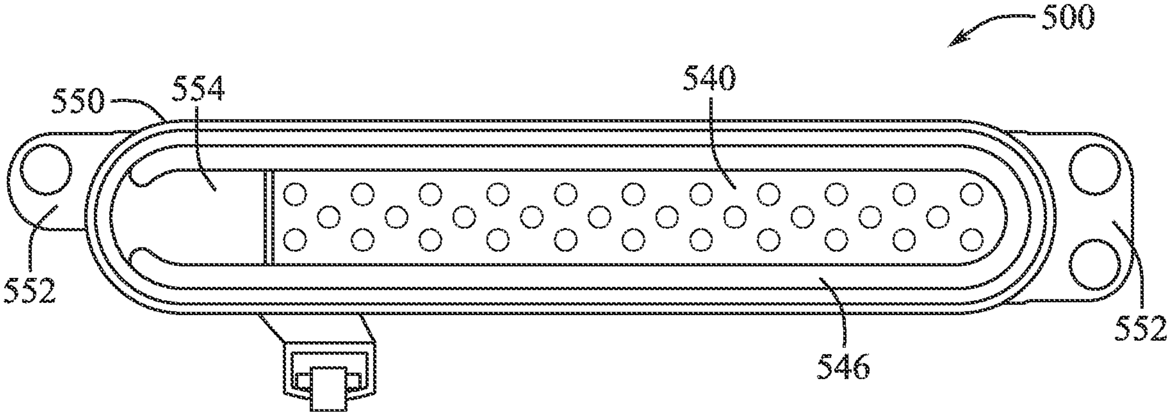
FIG. 3 shows a top plan view of an example of a mesh component.

In some examples, the mesh component 440 shown in FIGS. 2A-3 as well as other meshes described herein with reference to other figures can be formed of a metal such as stainless steel. In examples where the mesh component 440 is disposed over a port 418 above or adjacent to a speaker, which moves air through the mesh component 440, stainless steel and other metals forming the mesh component 440 can increase the stiffness of the mesh component 440. A stainless steel mesh component 440, for example, can be less prone to deflections and vibrations caused by the air from the speaker passing through the perforation holes 448 of the mesh component 440 than a polymer mesh or a mesh made of more flexible material. The stiffness of the stainless steel mesh component 440, i.e. its resistance to flexing and vibrations, prevents the mesh component 440 from acting as an additional diaphragm of the speaker when air is moving there through.

The size and spacing of the perforation holes 448 of the mesh component 440 or any other mesh component described herein can be tuned and adjusted to achieve an optimal balance of remaining acoustically transparent and/or permeable to air and acting as a barrier to water and debris from the external environment. In general, it has been found that the larger and more closely arranged the perforation holes are, the better the water ejection performance of the mesh will be. However, removing too much material to form the perforation holes can potentially weaken the mesh component 440 and reduce stiffness. Accordingly, in at least one example, the size of each perforation hole 448 can be at least about 100 microns or between about 100 microns and about 500 microns, for example at least about 140 microns or at least about 280 microns in diameter.

It is noted that while at least some of the figures described in the present application include mesh components having perforation holes, such as perforation holes 448, the same principles discussed with reference to the perforation holes 448, such as egress and ejection of water and debris through the mesh components, can be applied to porous features of non-perforated meshes. For example, woven wire meshes or porous materials can include features analogous to perforation holes, such as space between woven fibers and wires or pores present in porous materials, which allow water and debris to pass through the mesh component. That is, the examples of meshes having perforation holes are not meant as limiting. Rather, they are meant as exemplary only and the same advantages and principles discussed with reference to the size and spacing of perforation holes can be applied to the size and spacing of pores and other spaces and features of non-perforated meshes.

In addition to the material and the size, number, and configurations of the perforation holes described herein, any of the mesh component described herein can include a hydrophobic coating disposed on an external surface thereof to improve water repelling and ejection.

In addition, stiff meshes 440, including meshes 440 made of metals such as stainless steel, can more effectively handle high pressures, including high pressures due to submersion of the device in water. The stiff, metal mesh component 440 can be structurally sound under high pressures without deforming or deflecting under the pressure. Also, a stainless steel mesh component 440, or other stiff metal mesh component 440, can improve the ejection of water that may enter through the perforation holes 448. That is, because a stainless steel mesh component 440 is less prone to flexing and deforming, water passing through the perforation holes 448 are more readily broken up into small droplets, which are more readily ejected back out due to air from the speaker or other movements and forces caused by the movement of the device during use.

In any case, the mesh component 440, including the perforation holes or pores thereof, can allow at least some air to pass there through, for example air moved by an internal speaker, while substantially preventing dust and other debris from the external environment from passing there through. In at least one example, the mesh component 440 is acoustically transparent so that sound waves can propagate from a speaker in the internal volume of the device, through the mesh component 440, and out to the external environment.

The housing 402 includes an external surface 442 and an internal surface 444 with a thickness extending between the external and internal surfaces 442, 444. In at least one example, the mesh component 440 can be sealed, adhered, or pressed against the internal surface 444 of the housing 402 around a perimeter of the port 418. In one example, as shown in the close-up view of FIG. 2B, the mesh component 440 can be positioned to occlude the port 418 with an elastic barrier 446 disposed between the mesh component 440 and the internal surface 444 of the housing 402. In one example, the elastic barrier 446 is an elastic member disposed around a perimeter of the port 418 and is elastically compressed between the housing 402 and the mesh component 440. In this way, the elastic barrier 446 can maintain consistent or uninterrupted contact between the mesh component 440 and the housing 402 to effectively seal the space between the mesh component 440 and the internal surface 444 of the housing 402.

In at least one example, the elastic barrier 446 can include an elastic member or material such as a rubber, plastic, or other polymer. In one example, the elastic barrier 446 can include a foam material that can elastically compress and rebound. Other elastic materials can also be used. In at least one example, the elastic barrier 446 is secured in place by the pressing force between the mesh component 440 and the housing 402. In at least one example, the elastic barrier 446 can be secured to the mesh component 440 via an adhesive. The adhesive can include glues, pressure sensitive adhesives, or other adhesives. In at least one example, the elastic barrier 446 can be molded with or chemically bonded to the mesh component 440.

In at least one example, the elastic barrier 446 can be secured to the housing 402, specifically the internal surface 444 of the housing 402, via an adhesive. The adhesive can include glues, pressure sensitive adhesives, or other adhesives. In at least one example, the elastic barrier 446 can be molded with or chemically bonded to the housing 402.

FIG. 2C illustrates an exploded view of an example of the housing 402, elastic barrier 446, and mesh component 440 shown in FIG. 2B. In addition, the exploded view of FIG. 2C illustrates a speaker module 450 that can be disposed below the port 418 defined by the housing 402 and therefore below or adjacent to the mesh component 440. In at least one example, the mesh component 440 can be disposed directly against or contacting the speaker module 450. For example, the mesh component 440 can be adhered directly to the speaker module 450 via one or more adhesives, including pressure sensitive adhesives, disposed around a perimeter of the mesh component 440 and between the mesh component 440 and the speaker module 450. In at least one example, the mesh component 440 can be welded to, molded with, or bonded to the speaker module 450.

In at least one example, the speaker module 450 includes a bracket or bracket assembly 452 that secures the speaker module 450 against an internal component of the electronic device, for example a portion of a housing, bracket, or other component of the device to which the bracket assembly 452 can be secured. In this way, the speaker module 450, which can include one or more speakers having one or more diaphragms, can be held up against the mesh component 440 and elastic barrier 446, pressing the elastic barrier against the housing 402 as described above. In addition, in at least one example where the mesh component 440 is adhered to the speaker module 450, the mesh component 440 can be adhered using an adhesive, such as a pressure sensitive adhesive, around a perimeter of the speaker module 450 and the mesh component 440 so as not to adhere directly to any speaker diaphragms or other speaker components. For example, the mesh component 440 can be adhered around a perimeter of a speaker diaphragm of the speaker module 450, including being adhered to a housing or other speaker component surrounding the diaphragm.

As noted above, examples shown in the figures and described herein can include mesh components, such as mesh component 440, which include perforation holes 448, but mesh components of the present disclosure are not limited as such. For example, FIG. 2D shows an exploded view of an example of the housing 402, elastic barrier 446, and mesh component 440 shown in FIG. 2B, but with the mesh component 440 including a woven wire mesh component. The woven wire mesh component 440 can be disposed directly against the speaker module 450 with air travelling through spaces between individual wires of the woven wire mesh component 440.

FIG. 2E illustrates a cutaway, perspective cross-sectional view of the mesh component 440, housing 402, and speaker module 450 assembly shown in FIGS. 2A-2C. As shown in FIG. 2E, the housing 402, mesh component 440, elastic barrier 446, and speaker module 450 can be stacked and disposed as shown such that the mesh component 440 occludes the port 418. The perforation holes 448 defined by the mesh component 440, allow air moved by the speaker module 450 to pass through the mesh component 440 and out the port 418. Again, as noted above, in examples of non-perforated mesh components, such as woven wire mesh component 440 shown in FIG. 2D, or other porous materials and meshes described elsewhere herein, the perforation holes 448 shown in FIG. 2D can represent passageways provided by spaces between woven fibers or wires or pores passing through porous material meshes, such as the woven wire mesh 440 of FIG. 2D, that allow the passage of air from the speaker module 450 through the port 418.

Also, as noted above, the speaker module 450 can be secured within the device such that the speaker module 450 presses upward on the elastic barrier 446 to elastically compress the elastic barrier 446 against the housing 402. In at least one example, the elastic barrier 446 is not adhered, bonded, or otherwise secured to the housing 402. Rather, the elastic barrier 446 is held against the housing in an elastically compressed configuration due to the force of the speaker module 450 and mesh component 440 pressing upward thereon.

In at least one example, the mesh component 440 is disposed within a plane parallel to a plane in which the upper surface of the speaker module 450 is disposed. That is, the mesh component 440 lies parallel to a speaker or speaker diaphragm of the speaker module 450 so that there is not angular mismatch between the mesh component 440 and the speakers of the speaker module. This improves speaker sound transmission of air and sound waves through the mesh 440. Also, as noted above, the mesh component 440 can be formed of one or more stiff materials such as metals, including stainless steel or titanium, which also improves the quality of sound produced by the speaker module 450 because the stiff mesh material is resistant to deflection from the sound waves and air moving through the perforation holes 442 as opposed to less stiff materials, for example polymer and fiber materials.

In addition, using one or more metals to form the mesh component 440, for example stainless steel or titanium, allows for an addition metal layer to be applied to the mesh component 440, for example through a physical vapor deposition (PVD) method. Such a PVD layer can be used to impart a desired color for aesthetic reasons, for example a color matching the housing or other desirable color. In one example, titanium can be used to form mesh component 440 described herein. Titanium meshes can be anodized to achieve a desired color.

While a speaker module 450 is shown and described with reference to FIGS. 2A-2E, one or more other components are also contemplated herein that can be placed below or adjacent to the mesh component 440 and port 418 defined by the housing as shown. For example, one or more microphones can be disposed below the mesh component 440. In another example, one or more sensors, including pressure sensors configured to detect an external environmental pressure outside the housing 402, can be disposed below the mesh component 440 in the same way that the speaker module 450 is disposed as shown in FIGS. 2A-2E. In general, any component of an electronic device, which is disposed internally thereto, but that interacts with the external environment through one or more ports of the device, can be disposed relative to the mesh component 440 and elastic barrier 446 as shown in FIGS. 2A-2E with reference to the speaker module 450.

Any of the features, components, parts, including the arrangements and configurations thereof shown in FIGS. 2A-2E can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 2A-2E.

FIG. 3 shows a plan view of another example of a mesh assembly 500 that includes a mesh component 540 disposed over a speaker module 550 and an elastic barrier 546 disposed over and around at least a portion of the perimeter of the mesh component 540. The elastic barrier 546 can be pressed or disposed against an internal surface of a housing of an electronic device, as described similarly with reference to the elastic barrier 446 shown in FIGS. 2B-2E. The various components shown in FIG. 3, including the speaker module 550, bracket assembly 552, mesh component 540, and elastic barrier 546 can be secured to one another via one or more adhesive layers similar to those adhesive layers and securement methods, including welding, bonding, and molding, shown and described relative to the various components of FIGS. 2A-2E.

In addition, FIG. 3 illustrates an example where the elastic barrier 546 does not extend completely around an entire perimeter of the mesh component 540. Rather, the elastic barrier 546 of FIG. 3 includes a break. In addition, FIG. 3 illustrates an additional component 554 that can be disposed adjacent to the mesh component 540 and secured against the elastic barrier 546 similar to the mesh 554. This additional component 554 can include one or more of another mesh, sensor, microphone, or the like.

Any of the features, components, parts, including the arrangements and configurations thereof shown in FIG. 3. 3 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 3.

Figure 4A:
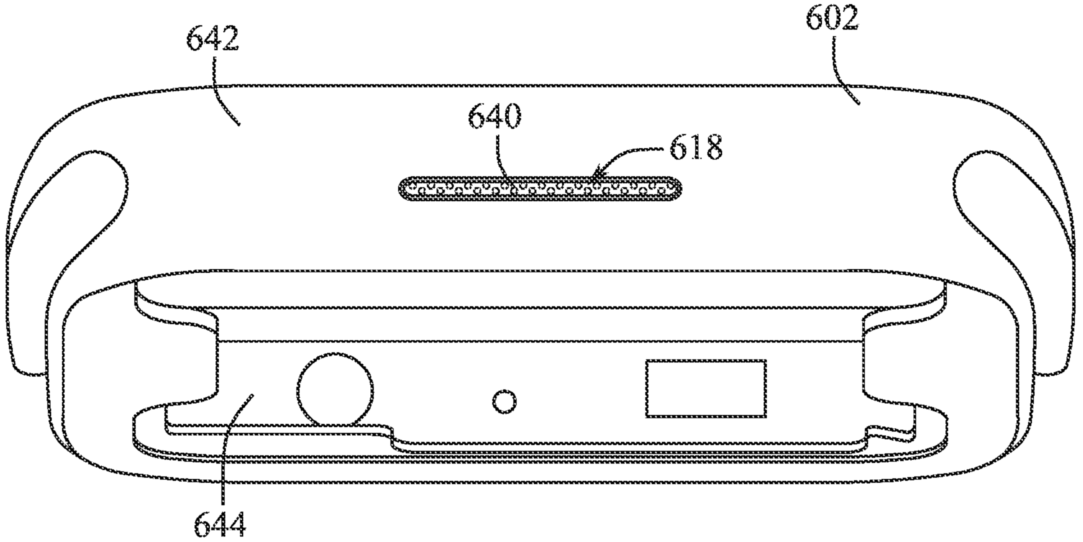
FIG. 4A shows a perspective view of a housing of an electronic device.

FIG. 4A illustrates an example of a housing 602 of an electronic device, with the housing defining a port 618. In order to prevent dirt, dust, water, or other debris from the external environment from entering into the internal volume defined by the housing 602, a mesh component 640 can be disposed over or across the port 618 to cover the port 618. In at least one example, the mesh component 640 extends upward and at least partially into the port 618 defined by the housing 602 such that at least a portion of the mesh component 640 is flush with an outer surface 642 of the housing 602.

In one example, the mesh component 640 can include a perforated material. The size, locations, and number of perforations extending through such a mesh can vary from one example to another. Such perforations can include machined, laser cut, or otherwise manufactured openings defined by and extending through the material. Such openings can be sized and arranged to prevent a certain size particle from the external environment from passing through the mesh component 640. Such openings can also be sized to prevent water from passing through the mesh component 640 at certain pressures.

Some examples of materials that can be perforated to form the mesh component 640 as described herein include rubbers, plastics, and other polymers. Other examples of meshes 640 can include metals such as steel, stainless steel, aluminum, and so forth. Ceramics can also be used to form the mesh component 640 and other meshes described herein. In at least one example, the mesh component 640 can be a porous material allowing air to pass through but preventing or substantially preventing dust and other debris particles from the external environment from passing through the mesh component 640 to an internal volume of the device. Some examples of such materials can include foams, knitted fabrics, other textiles, or other porous materials. Other materials can include fibers such as synthetic monofilament fibers and the like. The density of polymer meshes and other types of meshes, including porous and perforated meshes, can be tuned to be able to resist the ingress of water at high pressures. Typically, the higher the density, the higher the resistance.

In addition, using one or more metals to form the mesh component 640, for example stainless steel or titanium, allows for an addition metal layer to be applied to the mesh component 640, for example through a PVD method. Such a PVD layer can be used to impart a desired color for aesthetic reasons, for example a color matching the housing or other desirable color. In one example, titanium can be used to form mesh component 640 described herein. Titanium meshes can be anodized to achieve a desired color.

Figure 4B:
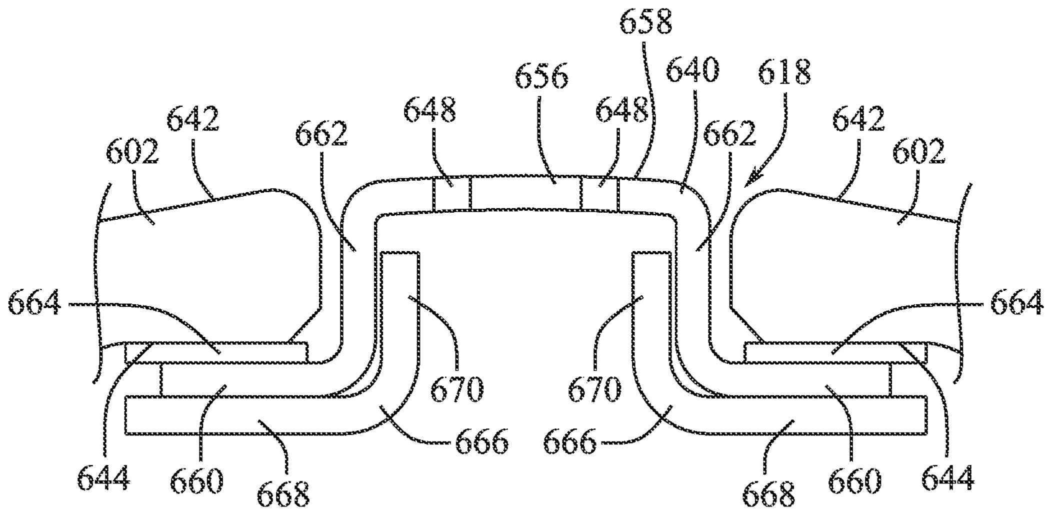
FIG. 4B shows a cross-sectional view thereof.
Figure 4C:
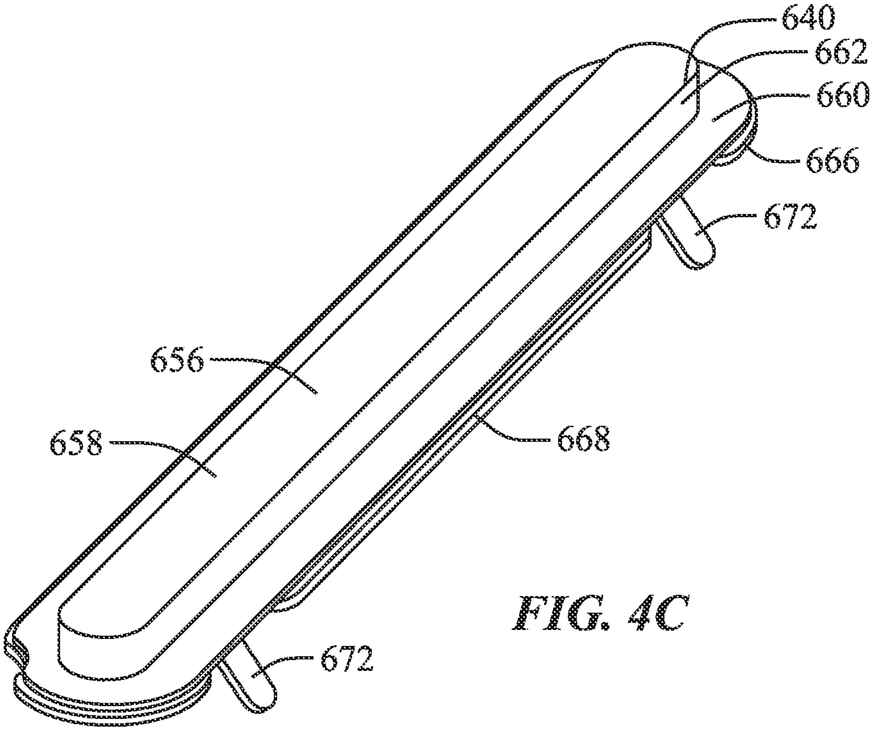
FIG. 4C shows a perspective view of a portion thereof.

In some examples, the mesh component 640 shown in FIGS. 4A-4C as well as other meshes described herein with reference to other figures can be formed of a metal such as stainless steel. In examples where the mesh component 640 is disposed over a port 618 above or adjacent to a speaker, which moves air through the mesh component 640, stainless steel and other metals forming the mesh component 640 can increase the stiffness of the mesh component 640. A stainless steel mesh component 640, for example, can be less prone to deflections and vibrations caused by the air from the speaker passing through the perforation holes 648 of the mesh component 640 than a polymer mesh or a mesh made of more flexible material. The stiffness of the stainless steel mesh component 640, i.e. its resistance to flexing and vibrations, prevents the mesh component 440 from acting as an additional diaphragm of the speaker when air is moving there through.

In addition, stiff meshes 640, including meshes 640 made of metals such as stainless steel, can more effectively handle high pressures, including high pressures due to submersion of the device in water. The stiff, metal mesh component 640 can be structurally sound under high pressures without deforming or deflecting under the pressure. Also, a stainless steel mesh component 640, or other stiff metal mesh component 640, can improve the ejection of water that may enter through the perforation holes 648. That is, because a stainless steel mesh component 640 is less prone to flexing and deforming, water passing through the perforation holes 648 are more readily broken up into small droplets, which are more readily ejected back out due to air from the speaker or other movements and forces caused by the movement of the device during use.

In any case, the mesh component 640, including the perforation holes or pores thereof, can allow at least some air to pass there through, for example air moved by an internal speaker, while substantially preventing dust and other debris from the external environment from passing there through. In at least one example, the mesh component 640 is acoustically transparent so that sound waves can propagate from a speaker in the internal volume of the device, through the mesh component 640, and out to the external environment.

FIG. 4B shows a cross-sectional view of the mesh component 640 situated within and/or across the port 618 to occlude or cover the port 618. More specifically, as shown in the cross-sectional view of FIG. 4B, one example of the mesh component 640 can include a raised portion 656 defining an external surface 658 of the mesh component 640. The raised portion 656 can also include walls 670 extending to a lower flange 660. The raised portion 656 can extend at least partially through the port 618 such that the outer surface 642 of the housing 602 is flush with the external surface 658 of the raised portion 656. In this way, the raised portion 656 forms a continuous surface that extends across the port 618, including the external surface 658 of the mesh component 640 and the external surface 658 of the raised portion 656 of the mesh component 640. One or more perforation holes 648 can extend through the raised portion 656 of the mesh component 640 as shown.

In at least one example, the mesh component 640 also includes a lower flange 660 extending radially outward from and circumferentially around the raised portion 656. The flange 660 can be connected to the raised portion 656 via sidewalls 662 of the mesh component 640. The sidewalls 662 of the mesh component 640 can extend at least partially from an internal volume of the device, where the sidewalls 662 meet the flange 660, and upward into the port 618 defined by the housing 602 and extending through ha thickness of the housing 602 from an external surface 642 thereof to an internal surface 644 thereof. In this way, in at least one example, the raised portion 656 of the mesh component 640 can be situated at or near the outer surface 642 of the housing 602 such that the external surface 658 of the raised portion 656 of the mesh component 640 is substantially flush with the external surface 642 of the housing 602.

In another example, the external surface 658 of the raised portion 656 of the mesh component 640 can be recessed from the external surface 642 of the housing 602 such that the external surface 658 of the raised portion 656 of the mesh component 640 is disposed lower than the external surface 642 of the housing 602. In this way, the mesh component 640 is less likely to be contacted or damaged upon contact with external objects, such as during a drop event of the device and so forth.

In at least one example, the flange 660 of the mesh component 640 can be secured to the internal surface 644 circumferentially adjacent to and surrounding the port 618. In at least one example, as shown in FIG. 4B, an adhesive material or layer 664 can be disposed between the flange 660 and the housing 602 as shown to secure the mesh component 640 to the housing 602. The adhesive layer 664 can include one or more of the adhesives described elsewhere herein, including pressure sensitive adhesive material as well as glues or other adhesives.

In at least one example, in addition to or instead of the adhesive layer 664 securing the mesh component 640 to the housing 602, a support bracket 666 can press upward on the mesh component 640 to secure the mesh component 640 against the housing 602. For example, the adhesive layer 664 can include an adhesive used during manufacturing to aid in assembly of the mesh component 640 and housing 602 but which may be unsuitable to support the mesh component 640 against the internal surface 644 of the housing 602 during use, for example if the device is dropped and/or the mesh component 640 is pressed inwardly during contact and use. Thus, the support bracket 666 can act to stabilize and support the mesh component 640 in place during drops, contacts, or any other forces pressing on the external surface 658 of the mesh component 640 during use. In at least one example, the adhesive layer 664 is not present and the mesh component 640 is fixed in position as shown in FIG. 4B via the support bracket 666 only.

In at least one example, the support bracket 666 includes an outwardly extending support flange 668 disposed to press against the flange 660 of the mesh component 640, as shown in FIG. 4B. In at least one example, the support bracket 666 can also include upwardly extending walls 670 that extends parallel or adjacent to the sidewalls 662 of the mesh component 640 to ensure proper placement and support between the support bracket 666 and the mesh component 640. In at least one example, the support bracket 666 remains fixed to the mesh component 640 via the friction force between the support flange 668 and the flange 660 of the mesh component 640 arising from the normal force produced by an upward force or pressing of the support bracket 666 toward the mesh component 640.

In at least one example, on or more adhesive layers can be disposed between the support flange 668 and the flange 660 of the mesh component 640 to secure the support bracket 666 to the mesh component 640. In at least one example, the support flange 668 and the flange 660 of the mesh component 640 can be molded together, welded together, or otherwise secured together.

In any case, the support bracket 666 can include one or more features or components that press against one or more other components or housings within the internal volume of the device in order to create the counterforce against the mesh component 640. FIG. 4C is one example of a mesh component 640 disposed on top of a support bracket 666 that includes a support flange 668 and one or more compliant mechanisms 672 that causes the support bracket 666 to press against one or more other components or housings at an internal volume of the device to create the counterforce against the mesh component 640 discussed above. The various examples of compliant mechanisms described herein, including compliant mechanism 672 shown in FIG. 4B, can include one or more elastic members or elastic configurations that are able to be elastically compressed and biased toward the internal surface 644 of the housing 602. In at least one example, the component against which the compliant mechanism 672 presses can include a speaker module such as those speaker modules described herein. In addition, the complaint mechanism can serve as a tolerance gap filling feature that allows for precise positioning and assembly of the mesh 640 and other components associated therewith.

In the illustrated example of FIG. 4C, the mesh component 640 can be similar to the mesh component 640 shown in FIG. 4B, including sidewalls 662 that extend between the flange 660 and the raised portion 656 that defines the external surface 658 of the mesh component 640. In at least one example, the complaint mechanism 672 can include one or more biasing protrusions that can elastically deform when pressed against another component or surface within the device to bias the support bracket 666 against the mesh component 640 as discussed above. In particular, in the illustrated example of FIG. 4C, the compliant mechanism 672 can be attached to the support bracket 666 or the support flange 668 thereof to bias the support flange 668 upward against the flange 660 of the mesh component 640 as shown in FIG. 4B as well. In at least one example, the flange 660 can press against or contact another component such as a speaker module or other internal component of the device described herein.

Any of the features, components, parts, including the arrangements and configurations thereof shown in FIGS. 4A-4C can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 4A-4C.

Figure 5:
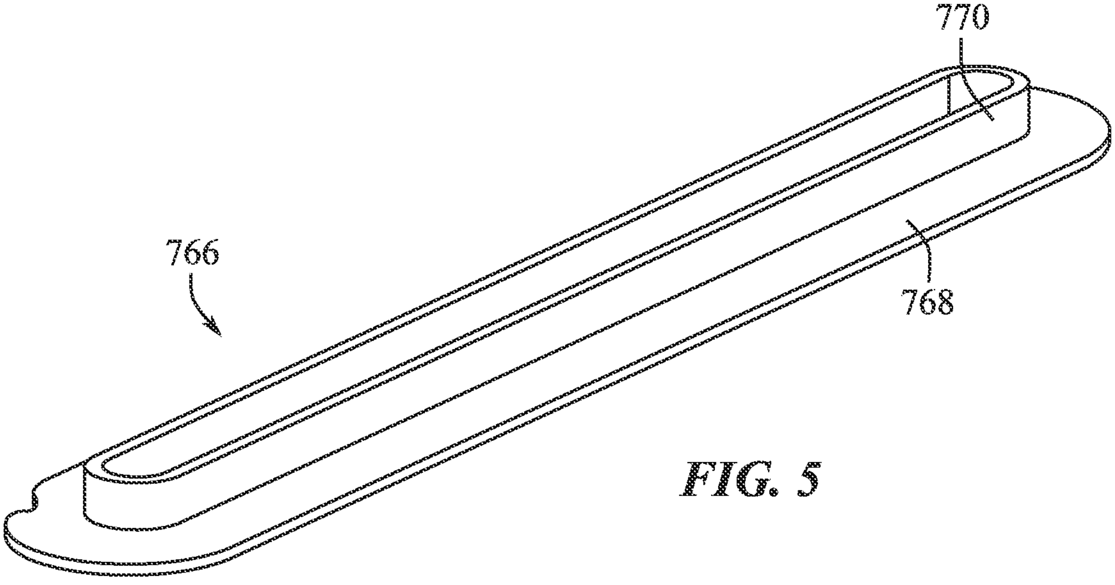
FIG. 5 shows an example of a support bracket for a mesh component.

FIG. 5 shows another example of a support bracket 766 that includes a support flange 768 extending radially outward from and circumferentially around wall 770. In at least one example, the support flange 768 can serve to press or bias against another component, such as a speaker module, microphone module, or other housing component or surface within the device to create the upward pressing force against a mesh or flange of a mesh, as described above. In this way, the support flange 768 can in itself be a compliant mechanism biasing and adjacent mesh upward against an internal surface of a housing of a device as discussed above. In addition, the support flange 768 can act as a tolerance gap filling feature during assembly.

Any of the features, components, parts, including the arrangements and configurations thereof shown in FIG. 5 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 5.

Figure 6:
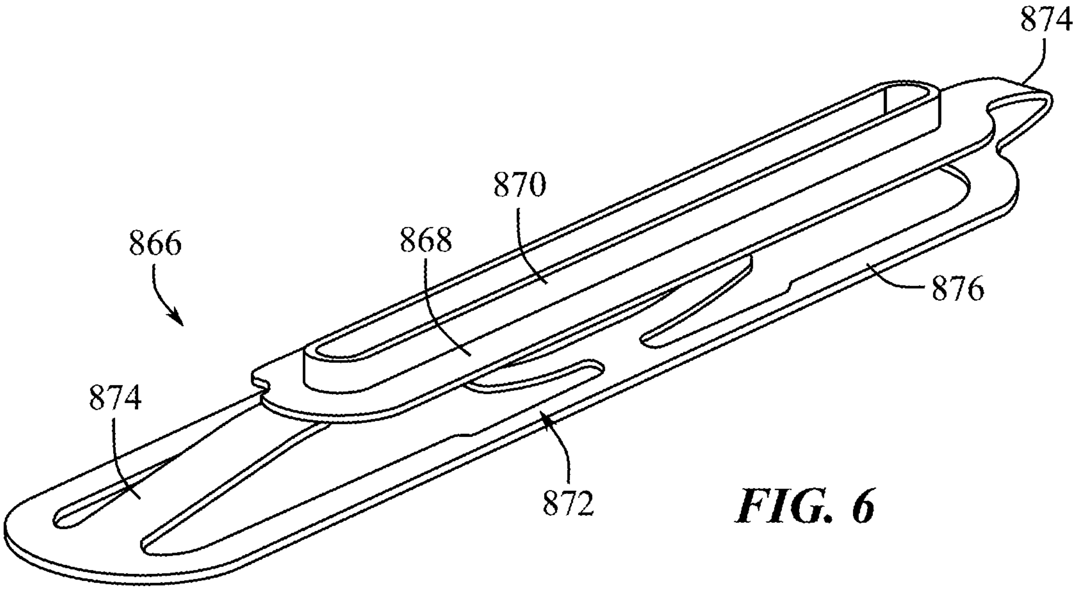
FIG. 6 shows an example of a support bracket for a mesh component.

FIG. 6 shows another example of a support bracket 866 including wall 870 and support flange 868, similar to other support brackets described herein. In addition, the example of support bracket 866 shown in FIG. 6 includes a compliant mechanism 872 for pressing against another component or surface within a device to bias the support flange 868 against a mesh as discussed above. In at least one example, the compliant mechanism 872 can include a base portion 876 connected to the support flange 868 of the support bracket 866 via one or more biasing connectors 874. The biasing connectors 874 can elastically deform and secure the base portion 876 of the compliant mechanism 872 to the support flange 868 so as to bias the support flange 868 upward or away from the base portion 876. The base portion 876 can be configured to contact or press against another surface or component within an electronic device, as discussed above.

Any of the features, components, parts, including the arrangements and configurations thereof shown in FIG. 6 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 6.

Figure 7:
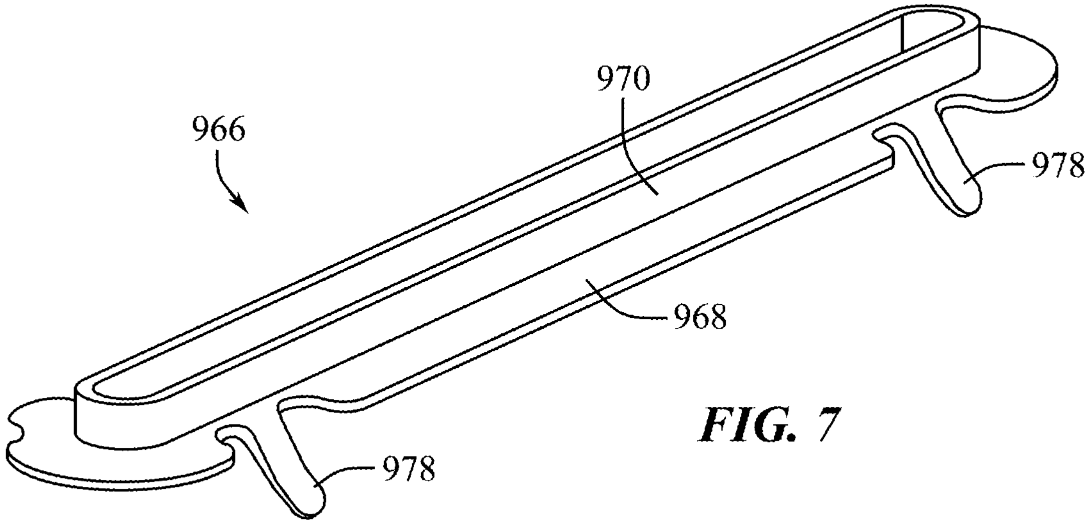
FIG. 7 shows an example of a support bracket for a mesh component.

FIG. 7 shows another example of a support bracket 966 that includes support flange 968 and wall 970, similar to other support brackets described herein. The illustrated example of the support bracket 966 can have a compliant mechanism that includes one or more biasing protrusions 978 extending at an angle downward from the support flange 968. In the illustrated example of FIG. 7, the biasing protrusions 978 can elastically deform where the biasing protrusions 978 meet or extend from the support flange 968 such that when pressed against another surface or component within an electronic device, the biasing protrusions 978 force or bias the support flange 968 away from that other surface or component and against a mesh or a flange of a mesh, as discussed above with reference to other support brackets and meshes.

Any of the features, components, parts, including the arrangements and configurations thereof shown in FIG. 7 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 7.

Figure 8:
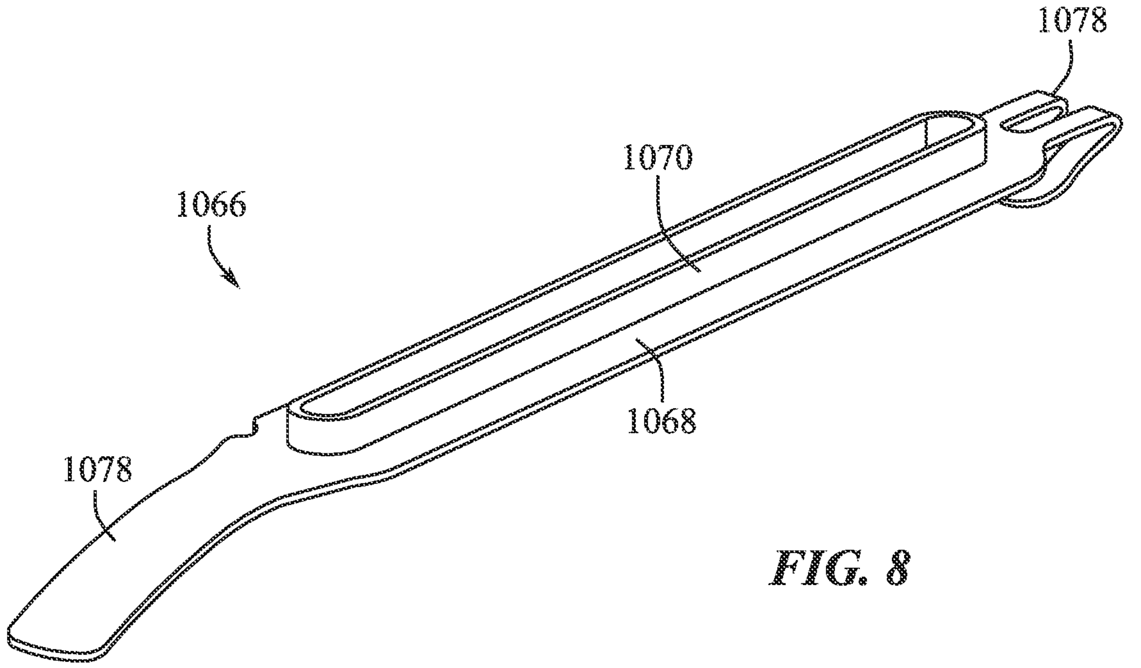
FIG. 8 shows an example of a support bracket for a mesh component.

FIG. 8 shows another example of a support bracket 1066 that includes support flange 1068 and wall 1070, similar to other support brackets described herein. The illustrated example of the support bracket 1066 can have a compliant mechanism that includes one or more biasing protrusions 1078 extending downward from the support flange 1068 as shown. FIG. 8 illustrates biasing protrusions 1078 that can function similar to the biasing protrusions 978 shown in FIG. 7 but which extend from a different portion of the support flange 1068 and which are shaped and sized differently. Other biasing protrusion shapes, sizes, number, and configurations are also contemplated herein that function to produce a counterforce that biases the support bracket 1066 against a mesh, as discussed elsewhere herein.

In the illustrated example of FIG. 8, the biasing protrusions 1078 can elastically deform where the biasing protrusions 1078 meet or extend from the support flange 1068 such that when pressed against another surface or component within an electronic device, the biasing protrusions 1078 force or bias the support flange 1068 away from that other surface or component and against a mesh or a flange of a mesh, as discussed above with reference to other support brackets and meshes.

Any of the features, components, parts, including the arrangements and configurations thereof shown in FIG. 8 can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIG. 8.

In the various examples of complaint mechanisms shown in FIGS. 4C-8, each mechanism can act as a tolerance gap filling feature to precisely secure the mesh and other associated components within the device. In addition, each compliant mechanism described herein includes one or more elastic features, for example complaint mechanisms 672, 870, support flange 768, and biasing protrusions 978, 1078, extend radially outward and away from the associated support flanges of the support brackets. In this way, the various compliant mechanisms, flanges, and biasing protrusions described herein are less likely to attract water and debris that may pass through the perforation holes of the meshes supported by the support brackets described herein.

Figure 9A:
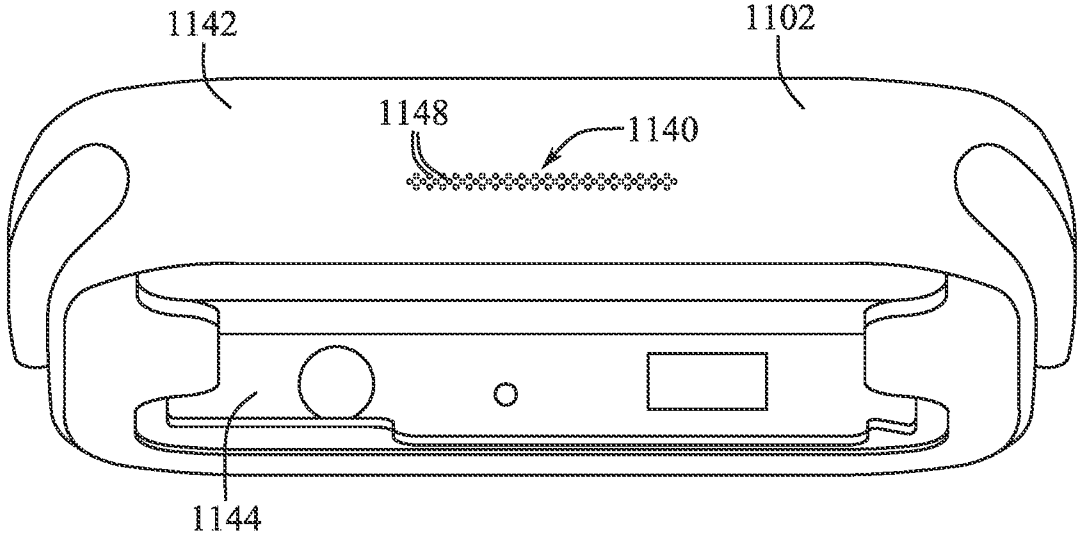
FIG. 9A shows a perspective view of a housing of an electronic component.
Figure 9B:
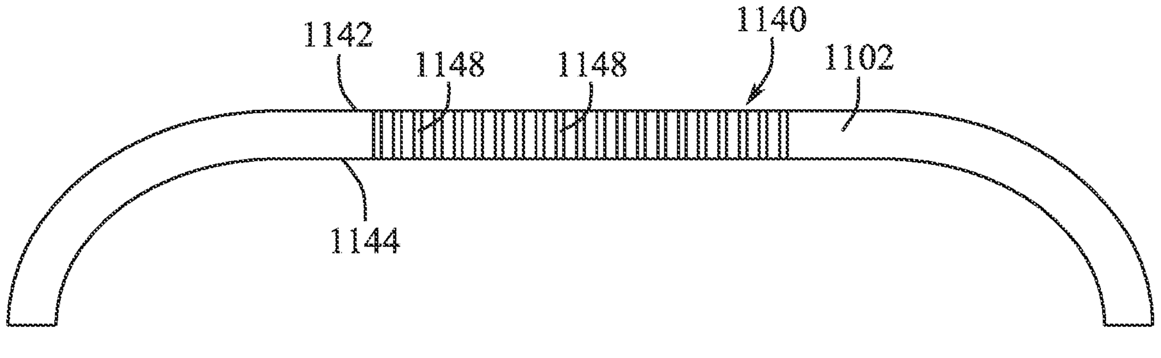
FIG. 9B shows a cross-sectional view thereof.

FIGS. 9A and 9B show a perspective view and a cross-sectional view, respectively, of another example of a mesh 1140 defined by a housing 1102 of an electronic device. In the example illustrated in FIGS. 9A and 9B, perforation holes 1148 extend directly through a thickness of the housing 1102 between the external surface 1142 of the housing 1102 and the internal surface 1144 of the housing 1102. Thus, in at least one example, the mesh 1140 and perforation holes 1148 thereof, can form the mesh 1140 without a port defined by the housing 1102. In such an example, the housing 1102 defines each hole of the perforation holes 1148 constituting the mesh 1140 of the housing 1102 under which an internal component, such as the speaker modules or other components described herein, can be disposed.

Any of the features, components, parts, including the arrangements and configurations thereof shown in FIGS. 9A-9B can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 9A-4B.

Figure 10A:
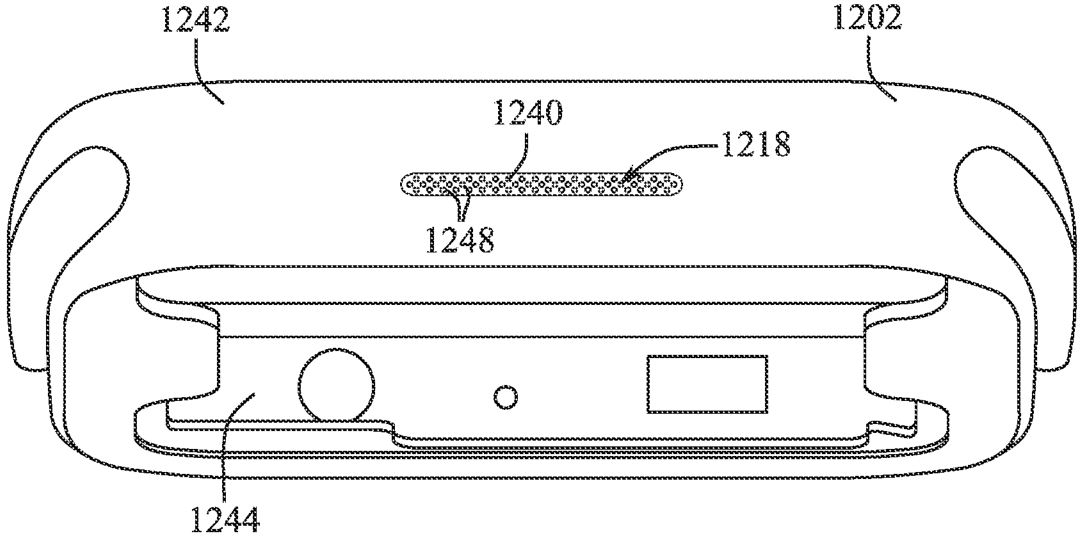
FIG. 10A shows a perspective view of a housing of an electronic component.
Figure 10B:
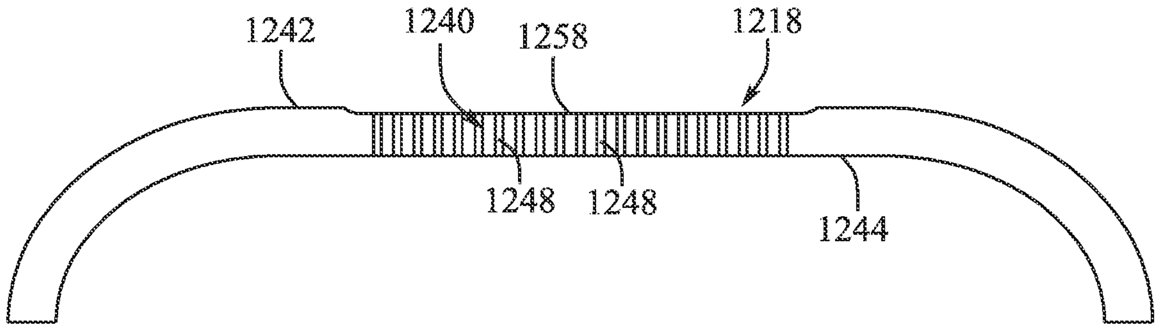
FIG. 10B shows a cross-sectional view thereof.

FIGS. 10A and 10B illustrate perspective and cross-sectional views, respectively, of another example of a mesh 1240 disposed within or across a port 1218 defined by a housing 1202 of an electronic device such that the mesh 1240 occludes or covers the port 1218. The mesh 1240 can define a number of perforation holes 1248. In another example, the mesh 1240 does not include perforation holes 1248 but includes porous materials noted elsewhere herein with reference to other mesh materials. In the illustrated example of FIGS. 10A and 10B, the port 1218 can include a recessed feature extending into a thickness of the housing 1202 from the external surface of the housing 1202. The mesh 1240, which defines the perforation holes 1248 and extends across the port 1218 thus includes an external surface 1258 that is recessed from the external surface 1242 of the housing 1202. The perforation holes 1248 can extend through the mesh 1240 from the external surface 1258 thereof to the internal surface 1244 of the housing 1202, which is shard with the mesh 1240. Because the external surface 1258 is recessed from the external surface 1242 of the housing 1202, the external surface 1258 of the mesh 1240 is less likely to be contacted and/or damaged during a fall event of the device, such as the device/housing 1202 being dropped on the ground or other surface or object by the user.

Any of the features, components, parts, including the arrangements and configurations thereof shown in FIGS. 10A-10B can be included, either alone or in any combination, in any of the other examples of devices, features, components, and parts shown in the other figures. Likewise, any of the features, components, parts, including the arrangements and configurations thereof shown in the other figures can be included, either alone or in any combination, in the example of the devices, features, components, and parts shown in FIGS. 10A-10B.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An electronic device, comprising:
- a housing defining an external surface, an internal volume, and an aperture;
- an electronic component disposed within the internal volume and occluding the aperture; and
- a mesh component comprising:
  - a flange disposed in the internal volume against the electronic component; and
  - a raised portion disposed in the aperture and defining the external surface.

2. The electronic device of claim 1, further comprising an adhesive disposed between the electronic component and the mesh component.

3. The electronic device of claim 1, wherein the electronic component comprises a speaker module.

4. The electronic device of claim 1, further comprising an elastic barrier disposed between the mesh component and an internal surface of the housing.

5. The electronic device of claim 4, wherein the elastic barrier is disposed against the internal surface of the housing around a perimeter of the aperture.

6. The electronic device of claim 4, wherein the elastic barrier comprises a foam material.

7. The electronic device of claim 6, wherein the foam material is elastically compressed between the mesh component and the housing.

8. The electronic device of claim 4, further comprising an adhesive disposed between the elastic barrier and the mesh component.

9. An electronic device comprising:
- a housing defining an internal volume and a port;
- a speaker module disposed within the internal volume and oriented to move air through the port; and
- an acoustically transparent mesh covering the port, the mesh comprising:
  - a raised portion extending at least partially through the port; and a flange extending along the raised portion, the flange secured against an internal surface of the housing; and a support bracket disposed against the flange such that the flange is disposed between the support bracket and the internal surface.

10. The electronic device of claim 9, wherein the support bracket comprises:

a support flange disposed against the flange; and a compliant mechanism that biases the mesh against the internal surface.

11. The electronic device of claim 10, wherein the compliant mechanism includes an elastic protrusion pressing against the speaker module.

12. The electronic device of claim 11, wherein the elastic protrusion extends outward and away from the support flange.

13. The electronic device of claim 9, further comprising an adhesive layer disposed between the flange and the internal surface of the housing, the adhesive layer securing the flange to the internal surface of the housing.

14. The electronic device of claim 9, wherein the raised portion defines an external surface disposed flush with an external surface of the housing.

15. An electronic device, comprising:

a housing defining an aperture;

a mesh component occluding the aperture and comprising a flange;

a raised portion; and a sidewall extending between the flange and the raised portion, the sidewall extending into the aperture; and an elastic member disposed against the mesh component and biased toward an internal surface of the housing.

16. The electronic device of claim 15, wherein the mesh component is disposed between the elastic member and the housing.

17. The electronic device of claim 15, wherein the elastic member is disposed between the mesh component and the housing.

18. The electronic device of claim 17, further comprising an internal electronic component, wherein the mesh component is disposed between the internal electronic component and the elastic member.

19. The electronic device of claim 18, wherein the mesh component is disposed directly against the internal electronic component and the elastic member is elastically compressed between the housing and the mesh component.

* * * * *